United States Patent
Fontaine et al.

(10) Patent No.: US 7,811,071 B2
(45) Date of Patent: Oct. 12, 2010

(54) SCROLL COMPRESSOR FOR CARBON DIOXIDE REFRIGERANT

(75) Inventors: Anne-France Fontaine, Soumagne (BE); Kirk E. Cooper, Worthington, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

(21) Appl. No.: 12/257,869

(22) Filed: Oct. 24, 2008

(65) Prior Publication Data

US 2009/0110581 A1 Apr. 30, 2009

Related U.S. Application Data

(60) Provisional application No. 60/982,156, filed on Oct. 24, 2007.

(51) Int. Cl.
 *F01C 21/00* (2006.01)
 *F03C 2/00* (2006.01)
 *F03C 4/00* (2006.01)

(52) U.S. Cl. .................. 418/178; 418/55.1; 418/55.3; 418/179

(58) Field of Classification Search ....... 418/55.1–55.6, 418/57, 178, 179
See application file for complete search history.

(56) References Cited

U.S. PATENT DOCUMENTS

| | | | |
|---|---|---|---|
| 3,600,114 A | 8/1971 | Dvorak et al. | |
| 3,759,057 A | 9/1973 | English et al. | |
| 4,029,476 A | 6/1977 | Knopp | |
| 4,205,532 A | 6/1980 | Brenan | |
| RE30,994 E | 7/1982 | Shaw | |
| 4,383,805 A | 5/1983 | Teegarden et al. | |
| 4,441,863 A | 4/1984 | Hotta et al. | |
| 4,456,435 A | 6/1984 | Hiraga et al. | |
| 4,468,178 A | 8/1984 | Hiraga et al. | |
| 4,497,615 A | 2/1985 | Griffith | |
| 4,514,150 A | 4/1985 | Hiraga et al. | |
| 4,550,480 A | 11/1985 | Tanikawa et al. | |
| 4,566,863 A | 1/1986 | Goto et al. | |
| 4,673,340 A | 6/1987 | Mabe et al. | |
| 4,747,756 A | 5/1988 | Sato et al. | |

(Continued)

FOREIGN PATENT DOCUMENTS

CN 1270661 10/2000

(Continued)

OTHER PUBLICATIONS

Written Opinion dated Apr. 27, 2009 regarding International Application No. PCT/US2008/012083.

(Continued)

*Primary Examiner*—Theresa Trieu
(74) *Attorney, Agent, or Firm*—Harness, Dickey & Pierce, P.L.C.

(57) ABSTRACT

A scroll machine is provided with wear resistant features to provide the scroll machine with improved operation when processing $CO_2$ refrigerant. In certain aspects, the scroll machine has an Oldham coupling comprising aluminum, where the aluminum has an anodized surface forming a passivation layer thereon. The scroll machine optionally further has a self-lubricating bearing capable of use in the $CO_2$ scroll machine for at least 1,000 hours of operation.

18 Claims, 3 Drawing Sheets

U.S. PATENT DOCUMENTS

| | | |
|---|---|---|
| 4,767,293 A | 8/1988 | Caillat et al. |
| 4,838,936 A | 6/1989 | Akechi |
| 4,846,633 A | 7/1989 | Suzuki et al. |
| 4,877,382 A | 10/1989 | Caillat et al. |
| 4,944,663 A | 7/1990 | Iizuka et al. |
| 4,958,993 A | 9/1990 | Fujio |
| 4,992,033 A | 2/1991 | Caillat et al. |
| 5,044,904 A | 9/1991 | Richardson, Jr. |
| 5,051,079 A | 9/1991 | Richardson, Jr. |
| 5,074,760 A | 12/1991 | Hirooka et al. |
| 5,074,761 A | 12/1991 | Hirooka et al. |
| 5,102,316 A | 4/1992 | Caillat et al. |
| 5,131,695 A | 7/1992 | Wiser |
| 5,192,195 A | 3/1993 | Iio et al. |
| 5,223,052 A | 6/1993 | Yamamoto et al. |
| 5,245,836 A | 9/1993 | Lorentzen et al. |
| 5,267,844 A | 12/1993 | Grassbaugh et al. |
| 5,320,506 A | 6/1994 | Fogt |
| 5,336,058 A | 8/1994 | Yokoyama |
| 5,392,512 A | 2/1995 | Fann et al. |
| 5,407,335 A | 4/1995 | Caillat et al. |
| 5,451,146 A | 9/1995 | Inagaki et al. |
| 5,478,220 A | 12/1995 | Kamitsuma et al. |
| 5,534,220 A | 7/1996 | Purnell et al. |
| 5,549,394 A | 8/1996 | Nowak et al. |
| 5,551,846 A | 9/1996 | Taylor et al. |
| 5,562,426 A | 10/1996 | Watanabe et al. |
| 5,577,897 A | 11/1996 | Inagaki et al. |
| 5,580,401 A | 12/1996 | Williamson |
| 5,591,014 A | 1/1997 | Wallis et al. |
| 5,594,186 A | 1/1997 | Krause et al. |
| 5,607,288 A | 3/1997 | Wallis et al. |
| 5,613,841 A | 3/1997 | Bass et al. |
| 5,639,225 A | 6/1997 | Matsuda et al. |
| 5,658,863 A | 8/1997 | Duncan et al. |
| 5,664,890 A | 9/1997 | Nowak et al. |
| 5,674,822 A | 10/1997 | Schlosberg et al. |
| 5,678,985 A | 10/1997 | Brooke et al. |
| 5,698,502 A | 12/1997 | Pafford et al. |
| 5,728,658 A | 3/1998 | Duncan |
| 5,732,322 A | 3/1998 | Nakamaru et al. |
| 5,744,434 A | 4/1998 | Schlosberg et al. |
| 5,750,750 A | 5/1998 | Duncan et al. |
| 5,759,298 A | 6/1998 | Williamson |
| 5,817,607 A | 10/1998 | Duncan et al. |
| 5,842,845 A | 12/1998 | Kawano et al. |
| 5,865,604 A | 2/1999 | Kawaguchi et al. |
| 5,890,876 A | 4/1999 | Suito et al. |
| 5,911,514 A | 6/1999 | Davies et al. |
| 5,919,034 A | 7/1999 | Kawano et al. |
| 5,921,761 A | 7/1999 | Eckels |
| 5,931,651 A | 8/1999 | Kawano et al. |
| 5,942,475 A | 8/1999 | Schlosberg et al. |
| 5,994,278 A | 11/1999 | Duncan et al. |
| 6,000,233 A | 12/1999 | Nishida et al. |
| 6,026,649 A | 2/2000 | Adachi |
| 6,029,459 A | 2/2000 | Iizuka et al. |
| 6,033,788 A | 3/2000 | Cawley et al. |
| 6,062,832 A | 5/2000 | Kawano et al. |
| 6,073,454 A | 6/2000 | Spauschus et al. |
| 6,074,573 A | 6/2000 | Kaneko |
| 6,079,962 A | 6/2000 | Seibel et al. |
| 6,092,993 A | 7/2000 | Young et al. |
| 6,099,278 A | 8/2000 | Hugenroth et al. |
| 6,106,252 A | 8/2000 | Yamanaka et al. |
| 6,109,899 A | 8/2000 | Barito et al. |
| 6,112,547 A | 9/2000 | Spauschus et al. |
| 6,116,867 A | 9/2000 | Wallis et al. |
| 6,120,255 A | 9/2000 | Schumann et al. |
| 6,123,009 A | 9/2000 | Kanayama et al. |
| 6,123,517 A | 9/2000 | Brooke et al. |
| 6,129,530 A | 10/2000 | Shaffer |
| 6,132,177 A | 10/2000 | Loprete et al. |
| 6,139,294 A | 10/2000 | Haller |
| 6,139,295 A | 10/2000 | Utter et al. |
| 6,143,241 A | 11/2000 | Hajaligol et al. |
| 6,146,118 A | 11/2000 | Haller et al. |
| 6,171,084 B1 | 1/2001 | Wallis et al. |
| 6,176,094 B1 | 1/2001 | Ohta et al. |
| 6,176,685 B1 | 1/2001 | Iizuka et al. |
| 6,176,686 B1 | 1/2001 | Wallis et al. |
| 6,185,955 B1 | 2/2001 | Yamamoto |
| 6,189,322 B1 | 2/2001 | Ishihara et al. |
| 6,196,814 B1 | 3/2001 | Cooksey et al. |
| 6,210,136 B1 | 4/2001 | Kawano et al. |
| 6,213,731 B1 | 4/2001 | Doepker et al. |
| 6,247,909 B1 | 6/2001 | Williams et al. |
| 6,250,093 B1 | 6/2001 | Fujii et al. |
| 6,254,755 B1 | 7/2001 | Miura et al. |
| 6,263,683 B1 | 7/2001 | Tazaki |
| 6,293,767 B1 | 9/2001 | Bass |
| 6,299,424 B1 | 10/2001 | Futagami et al. |
| 6,302,665 B1 | 10/2001 | Esumi et al. |
| 6,306,803 B1 | 10/2001 | Tazaki |
| 6,331,925 B1 | 12/2001 | Loprete et al. |
| 6,354,094 B2 | 3/2002 | Tazaki |
| 6,358,298 B1 | 3/2002 | Gagné et al. |
| 6,389,823 B1 | 5/2002 | Loprete et al. |
| 6,390,682 B1 | 5/2002 | McMeekin et al. |
| 6,398,598 B2 | 6/2002 | Masumoto |
| 6,410,492 B1 | 6/2002 | Shimomura et al. |
| 6,412,293 B1 | 7/2002 | Pham et al. |
| 6,416,851 B1 | 7/2002 | Kuroiwa et al. |
| 6,419,457 B1 | 7/2002 | Seibel et al. |
| 6,425,977 B2 | 7/2002 | McDonald et al. |
| 6,427,479 B1 | 8/2002 | Komatsubara et al. |
| 6,457,948 B1 | 10/2002 | Pham |
| 6,461,679 B1 | 10/2002 | McMeekin et al. |
| 6,478,550 B2 | 11/2002 | Matsuba et al. |
| 6,478,983 B1 | 11/2002 | Matsuura et al. |
| 6,537,043 B1 | 3/2003 | Chen |
| 6,544,017 B1 | 4/2003 | Skinner |
| 6,560,868 B2 | 5/2003 | Milliff et al. |
| 6,591,621 B2 | 7/2003 | Loprete et al. |
| 6,656,891 B1 | 12/2003 | Sakanoue et al. |
| 6,672,846 B2 | 1/2004 | Rajendran et al. |
| 6,679,683 B2 | 1/2004 | Seibel et al. |
| 6,692,654 B2 | 2/2004 | Osumi et al. |
| 6,705,848 B2 | 3/2004 | Scancarello |
| 6,709,244 B2 | 3/2004 | Pham |
| 6,746,154 B2 | 6/2004 | Green et al. |
| 6,759,373 B2 | 7/2004 | Tazaki |
| 6,821,092 B1 | 11/2004 | Gehret et al. |
| 6,827,563 B2 | 12/2004 | Hiwata et al. |
| 6,841,522 B2 | 1/2005 | Corner et al. |
| 6,846,430 B2 | 1/2005 | Tazaki |
| 6,849,583 B2 | 2/2005 | Corr et al. |
| 6,878,677 B1 | 4/2005 | Sakanoue et al. |
| 6,884,042 B2 | 4/2005 | Zili et al. |
| 6,893,229 B2 | 5/2005 | Choi et al. |
| 6,894,010 B2 | 5/2005 | Ikeda |
| 6,953,053 B2 | 10/2005 | Waffler et al. |
| 6,953,324 B1 | 10/2005 | Young et al. |
| 7,018,961 B2 | 3/2006 | Tazaki |
| 7,044,717 B2 | 5/2006 | Dreiman et al. |
| 7,074,013 B2 | 7/2006 | Seibel et al. |
| 7,086,151 B2 | 8/2006 | Scancarello |
| 7,094,038 B2 | 8/2006 | Choi |
| 7,131,291 B2 | 11/2006 | Aflekt et al. |
| 7,144,235 B2 | 12/2006 | Yoshimura et al. |
| 7,156,014 B2 | 1/2007 | Sugioka et al. |
| 7,303,693 B2 | 12/2007 | Fahl et al. |
| 2003/0231815 A1 | 12/2003 | Takayasu et al. |
| 2004/0063590 A1 | 4/2004 | Gibb et al. |

| | | | | | |
|---|---|---|---|---|---|
| 2005/0019177 A1 | 1/2005 | Shin et al. | JP | 07-090323 | 4/1995 |
| 2005/0019178 A1 | 1/2005 | Shin et al. | JP | 07-090324 | 4/1995 |
| 2005/0019179 A1 | 1/2005 | Shin et al. | JP | 07-090510 | 4/1995 |
| 2005/0127320 A1 | 6/2005 | Fahl et al. | JP | 07-090511 | 4/1995 |
| 2006/0067846 A1* | 3/2006 | Okaichi et al. .............. 418/63 | JP | 07-090512 | 4/1995 |
| 2006/0128576 A1 | 6/2006 | Tazaki | JP | 07-069015 | 7/1995 |
| 2007/0067990 A9 | 3/2007 | Scancarello | JP | 07-180681 | 7/1995 |
| 2007/0092390 A1 | 4/2007 | Ignatiev et al. | JP | 07-188829 | 7/1995 |
| 2007/0122257 A1 | 5/2007 | Bauer et al. | JP | 07-197213 | 8/1995 |
| 2007/0213239 A1 | 9/2007 | Kaneko | JP | 07-259765 | 10/1995 |
| 2007/0272893 A1 | 11/2007 | Kaneko | JP | 07-299532 | 11/1995 |
| 2008/0181801 A1 | 7/2008 | Stover et al. | JP | 08159061 A * | 6/1996 |
| 2008/0190284 A1 | 8/2008 | Sugioka et al. | JP | 08-338364 | 12/1996 |
| 2008/0247895 A1 | 10/2008 | Caillat et al. | JP | 09-032747 | 2/1997 |
| 2008/0253909 A1 | 10/2008 | Kawabata et al. | JP | 09-073847 | 3/1997 |
| 2009/0060749 A1 | 3/2009 | Hoying et al. | JP | 10-046169 | 2/1998 |
| 2009/0071183 A1 | 3/2009 | Stover et al. | JP | 10-147682 | 6/1998 |
| 2009/0200507 A1 | 8/2009 | Tagawa et al. | JP | 10-272559 | 10/1998 |
| 2009/0242160 A1 | 10/2009 | Obara et al. | JP | 10-281064 | 10/1998 |
| | | | JP | 11-173274 | 6/1999 |

FOREIGN PATENT DOCUMENTS

| | | |
|---|---|---|
| DE | 3514230 | 10/1986 |
| DE | 19719132 | 11/1998 |
| DE | 19719430 | 2/1999 |
| DE | 29914502 | 11/1999 |
| DE | 19835226 | 2/2000 |
| EP | 0060140 | 3/1982 |
| EP | 0053301 | 6/1982 |
| EP | 0174516 | 4/1990 |
| EP | 0435243 | 7/1991 |
| EP | 0485979 | 5/1992 |
| EP | 0681105 | 11/1995 |
| EP | 0730020 | 9/1996 |
| EP | 0747597 | 12/1996 |
| EP | 0908509 | 4/1999 |
| EP | 0952206 | 10/1999 |
| EP | 0974633 | 1/2000 |
| EP | 0974686 | 1/2000 |
| EP | 0992572 | 4/2000 |
| EP | 1008643 | 6/2000 |
| EP | 1063279 | 12/2000 |
| EP | 1132457 | 9/2001 |
| EP | 0979859 | 5/2002 |
| EP | 1203807 | 5/2002 |
| EP | 0688854 | 5/2003 |
| EP | 1491616 | 12/2004 |
| EP | 1489261 | 1/2006 |
| EP | 1281863 | 1/2007 |
| EP | 1790712 | 5/2007 |
| EP | 1795570 | 6/2007 |
| EP | 1881057 | 1/2008 |
| EP | 1953384 | 8/2008 |
| EP | 1964910 | 9/2008 |
| EP | 0980416 | 6/2009 |
| GB | 2306497 | 5/1997 |
| GB | 2403271 | 12/2004 |
| JP | 57-135291 | 8/1982 |
| JP | 58-126492 | 7/1983 |
| JP | 58-210392 | 12/1983 |
| JP | 59-192881 | 11/1984 |
| JP | 59-211781 | 11/1984 |
| JP | 61-226589 | 10/1986 |
| JP | 62-003188 | 1/1987 |
| JP | 63036082 A * | 2/1988 |
| JP | 02067481 A * | 3/1990 |
| JP | 02-151341 | 6/1990 |
| JP | 02-173378 | 7/1990 |
| JP | 03-202691 | 9/1991 |
| JP | 05-161947 | 6/1993 |
| JP | 06-128666 | 5/1994 |
| JP | 06-507928 | 9/1994 |
| JP | 07077180 A | 3/1995 |
| JP | 11-315295 | 11/1999 |
| JP | 11-336674 | 12/1999 |
| JP | 2000-009034 | 1/2000 |
| JP | 2000-073080 | 3/2000 |
| JP | 2000-169868 | 6/2000 |
| JP | 2000-169869 | 6/2000 |
| JP | 2000-255043 | 9/2000 |
| JP | 2000-294665 | 10/2000 |
| JP | 2001-073002 | 3/2001 |
| JP | 2001-115958 | 4/2001 |
| JP | 2001-234305 | 8/2001 |
| JP | 2001-255029 | 9/2001 |
| JP | 2001-255030 | 9/2001 |
| JP | 2001-276967 | 10/2001 |
| JP | 2005-076611 | 3/2005 |
| JP | 2005076611 A | 3/2005 |
| KR | 10-2001-0022907 | 3/2001 |
| KR | 2002023514 A * | 3/2002 |
| KR | 10-2003-77596 | 10/2003 |
| KR | 10-2006-0039180 | 5/2006 |
| KR | 10-2007-0026144 | 3/2007 |
| KR | 1020070026144 | 3/2007 |
| WO | WO 97/07182 | 2/1997 |
| WO | WO 98/10040 | 3/1998 |
| WO | WO 98/50499 | 11/1998 |
| WO | WO 98/50738 | 11/1998 |
| WO | WO 99/13032 | 3/1999 |
| WO | WO 2008/091564 | 7/2008 |
| WO | WO 2008/123947 | 10/2008 |
| WO | WO 2009/005574 | 1/2009 |
| WO | WO 2009/032182 | 3/2009 |
| WO | WO 2009/055009 | 4/2009 |

OTHER PUBLICATIONS

International Search Report dated Apr. 27, 2009 regarding International Application No. PCT/US2008/012083.

"Metals Handbook Desk Edition," pp. 29•44-29•45 (American Society for Metals, 1985).

"Metals Handbook," 8th Edition, vol. 2, p. 621 (American Society for Metals, 1964).

Aluminum Anodizers Council, "Anodizing Reference Guide," Anodized coating, Type III Anodize Thickness Guide Table 1(No Publication Date).

Brendgaard, "Operating as Low-Stage Compressor in a R744/R717 Cascade System," (The Refrigeration Science and Technology Proceedings, Aarhus, Denmark, (Sep. 3-6, 1996).

Hesse et al., "Lubricants for Carbon Dioxide," International Congress of Refrigeration, IIF/IIR Commissions B1, B2, E1 and E2—Aarhus (Denmark) 1996-3, pp. 605-610.

Kim, M. et al., "Fundamental process and system design issues in $CO_2$ vapor compression systems," Progress in Energy and Combustion Science 30 (2004) pp. 119-174.

Pachai, A., "CO2 Cycles in a Historic Perspective," 8th IIR Gustav Lorentzen Conference on Natural Working Fluids, Copenhagen, 2008.

Randles, S. et al., "A Critical Assessment of Synthetic Lubricant Technologies for Alternative Refrigerants," Air Conditioning and Refrigeration Industry, Conf. of Parties to the Framework Convention on Climate Change, http://www.word.uniqema.com/public/uniq/business/uniq0419.nsf printed on Apr. 14, 2006.

Renz, H., "Semi Hermetic Reciprocating and Screw Compressors for Carbon Dioxide Cascade Systems," 20th International Congress of Refrigeration, IIR/IIF, Sydney, 1999, pp. 1-7.

Wabash Alloys, "Aluminum Alloy Data Book," Characteristics—Aluminum Alloys, (No Publication Date).

"Powder Metallurgy Handbook," pp. 134-138, (Jul. 1994), Chinese language document from Taiwanese Office Action issued Oct. 21, 2003 in Taiwanese Patent Application No. TW91117214.

A Partial European Search Report; Lack of Unity Invention Sheet B and Annex to the European Search Report regarding EP Application No. 08251177.5-1267 dated Nov. 17, 2008.

ACHR, "New Challenges Create New Technologies," The Air Conditioning Heating Refrigeration News, p. 16 (Sep. 7, 2009).

ASTM D-2422-97, "Standard Classification of Industrial Fluid Lubricants by Viscosity System," p. 830 (1997).

Bartz, W., "Comparison of Properties of Synthetic Fluids," Tribology Data Handbook, E. Richard Booser, Ed., CRC Press, Boca Raton, FL, pp. 35-36 (1997).

Beimesch, B., "Organic Esters," Tribology Data Handbook, E. Richard Booser, Ed., CRC Press, Boca Raton, FL, pp. 42-48 (1997).

Bock, W., "Kältemaschinenöl—Kältemittel Die Physik muβ stimmen," Kältetechnik/Öl-Kältemittel-Systeme, (Mar. 1997) German language document with machine translation.

Bock, W., "Kältemaschinenöle für natürliche Kältemittel," Rensio Kältemaschinenöle, German language document with machine translation, date unknown.

Chen, C., "Typical Lubricating Oil Properties," Tribology Data Handbook, E. Richard Booser, Ed., CRC Press, Boca Raton, FL, pp. 3-33 (1997).

Extended Search Report regarding European Patent Application No. EP 08 25 1177.5-1267 dated Oct. 22, 2008 (mailed Mar. 17, 2009).

Fahl, J., "Schmierstoffe für den Einsatz mit Kohlendioxid als Kältemittal [Lubricants for use with carbon dioxide as refrigerant]" Ki Luft- Kaeltetech. (1998), 34(8), 375-379, (1998). German language document, no translation.

Fahl, J., "Schmierstoffe für den Einsatz mit Kohlendioxid als Kältemittal," (DKV-Tagungsbericht, 1997) pp. 114-130. German language document with machine translation.

Fahl, J.et al., "Synthetische Kältemaschinenöle," DIE KÄLTE and Klimatechnik (Nov. 1996). German language document with machine translation.

German, R., "Injection Molding of Metals and Ceramics," Metal Powder Industries Foundation, pp. 315-320 (1997).

International Preliminary Report on Patentability dated Jan. 5, 2010 regarding International Application No. PCT/US2008/007184.

International Search Report for International Application No. PCT/US2008/007184 dated Oct. 17, 2008.

Jonsson, U., "Elastohydrodynamic lubrication and lubricant rheology in refrigeration compressors," Doctoral thesis, Division of Machine Elements Department of Mechanical Engineering, Luleå University of Technology, (May 1998).

Lilje, K., et al., "Refrigeration and Air Conditioning Lubricants," Tribology Data Handbook, E. Richard Booser, Ed., CRC Press, Boca Raton, FL, pp. 342-354 (1997).

Wertenbach, J. et al. "CO2 Refrigeration Systems in Automobile Air-Conditioning," from Washington DC Conference, pp. 855-864 (Aug. 1996).

Written Opinion of the International Searching Authority for International Application No. PCT/US2008/007184 dated Oct. 17, 2008.

Zoz, S., "Critical Solution Temperature for Ten Different Non-CFC Refrigerants With Fourteen Different Lubricants," Proccedings from the International Refrigeration Conference at Purdue, West Lafayette, Indiana (Jul. 19-22, 1994).

* cited by examiner

SCROLL COMPRESSOR FOR CARBON DIOXIDE REFRIGERANT

CROSS-REFERENCE TO RELATED APPLICATIONS

This application claims the benefit of U.S. Provisional Application No. 60/982,156 filed on Oct. 24, 2007, the entire disclosure of which is incorporated herein by reference in its entirety.

FIELD

The present disclosure relates generally to scroll-type machines. More particularly, the present disclosure relates to a scroll-type compressor for use with $CO_2$ refrigerant.

BACKGROUND

The statements in this section merely provide background information related to the present disclosure and may not constitute prior art.

Scroll machines in general, and particularly scroll compressors, are often disposed in a hermetic shell which defines a chamber within which is disposed a working fluid. A partition within the shell often divides the chamber into a discharge pressure zone and a suction pressure zone. In a low-side arrangement, a scroll assembly is located within the suction pressure zone for compressing the working fluid. Generally, these scroll assemblies incorporate a pair of intermeshed spiral wraps, one or both of which are caused to orbit relative to the other so as to define one or more moving chambers which progressively decrease in size as they travel from an outer suction port towards a center discharge port. An electric motor is normally provided which operates to cause this relative orbital movement.

The partition within the shell allows compressed fluid exiting the center discharge port of the scroll assembly to enter the discharge pressure zone within the shell while simultaneously maintaining the integrity between the discharge pressure zone and the suction pressure zone. This function of the partition is normally accomplished by a seal which interacts with the partition and with the scroll member defining the center discharge port.

The discharge pressure zone of the hermetic shell is normally provided with a discharge fluid port which communicates with a refrigeration circuit or some other type of fluid circuit. In a closed system, the opposite end of the fluid circuit is connected with the suction pressure zone of the hermetic shell using a suction fluid port extending through the shell into the suction pressure zone. Thus, the scroll machine receives the working fluid from the suction pressure zone of the hermetic shell, compresses this working fluid in the one or more moving chambers defined by the scroll assembly, and then discharges the compressed working fluid into the discharge pressure zone of the compressor. The compressed working fluid is directed through the discharge port through the fluid circuit and returns to the suction pressure zone of the hermetic shell through the suction port.

Various refrigerants have been utilized in refrigeration systems having a scroll machine. When the scroll machine is used as a compressor in refrigeration, as well as air conditioning and heat pump applications, it is particularly advantageous to operate the scroll machine at the optimum pressure for the refrigerant and refrigeration system. Often times, a scroll machine which is designed for one refrigerant does not operate well for use with other refrigerants due to the different solvent properties of the different refrigerants and due to pressure and operating temperature differences. Additionally, hermetic compressors may pose particular design challenges, as they are typically not disassembled for regular maintenance of internal parts. Thus failure or degradation of certain components can end a hermetic compressor's service life. Accordingly, the present disclosure is directed to a scroll machine which is designed to operate efficiently and to have improved wear resistance when operated with $CO_2$ refrigerant.

SUMMARY

In various aspects, the present teachings pertain to a scroll machine. In certain aspects, a scroll machine includes a first scroll member having a discharge port and a first spiral wrap, as well as a second scroll member having a second spiral wrap. The first and second spiral wraps are mutually intermeshed. The scroll machine also has a discharge chamber in fluid communication with the discharge port of the first scroll member. A motor causes the second scroll member to orbit with respect to the first scroll member, where the wraps create at least one enclosed space of progressively changing volume between a peripheral suction zone defined by the scroll members and the discharge port to generate a pressurized fluid. Further, the scroll machine includes an Oldham coupling keyed to both the first and second scroll members to prevent rotational movement of the second scroll member. The Oldham coupling is formed of a metal material that comprises aluminum and has an anodized surface comprising a passivation layer. In various aspects, the scroll machine having such an Oldham coupling is capable of use for at least 1,000 hours of carbon dioxide scroll machine operation.

In other aspects, the present disclosure provides a scroll machine that includes a shell, a first scroll member having a first spiral wrap and being disposed in the shell, and a second scroll member having a second spiral wrap and being disposed in the shell. The first and second spiral wraps are mutually intermeshed and a drive mechanism causes the first scroll member to orbit with respect to the second scroll member, whereby the wraps create at least one enclosed space of progressively changing volume between a peripheral suction zone defined by the scroll members and a discharge port defined by the second scroll member. A bearing housing disposed below the first scroll member defines a cylindrical opening extending there through and a bearing member is received in the bearing housing and is disposed directly against the shaft. The bearing member includes a self-lubricating bearing material. The scroll machine also includes an Oldham coupling disposed between the first scroll member and the bearing housing to prevent rotational movement of the first scroll member. The Oldham coupling is formed from a metal material comprising aluminum and having an anodized surface comprising a passivation layer having a thickness of greater than or equal to about 5 micrometers.

In yet other aspects, the present disclosure provides a carbon dioxide scroll machine that processes a refrigerant comprising carbon dioxide. The machine includes a first scroll member having a discharge port and a first spiral wrap, as well as a second scroll member having a second spiral wrap. The first and second spiral wraps are mutually intermeshed with one another. The carbon dioxide scroll machine also includes a drive mechanism for causing the second scroll member to orbit with respect to the first scroll member, where the wraps create at least one enclosed space of progressively changing volume between a peripheral suction zone defined by the scroll members and the discharge port, said drive mechanism including a crankshaft drivingly engaging said second scroll member. A bearing assembly engages a crankshaft. The bearing assembly includes a bearing housing defining a cylindrical opening extending there through and a self-lubricating bearing member received in the bearing housing and disposed directly against the shaft. In certain aspects, the self-lubricating bearing member is capable of use for at least 1,000 hours of carbon dioxide scroll machine operation. In yet other aspects, the self-lubricating bearing member is capable of use for at least 2,000 hours of carbon dioxide scroll machine operation.

Further areas of applicability of the present disclosure will become apparent from the detailed description provided hereinafter. It should be understood however that the detailed description and specific examples, while indicating preferred embodiments of the disclosure, are intended for purposes of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description and the accompanying drawings, wherein.

DETAILED DESCRIPTION

Figure 1:
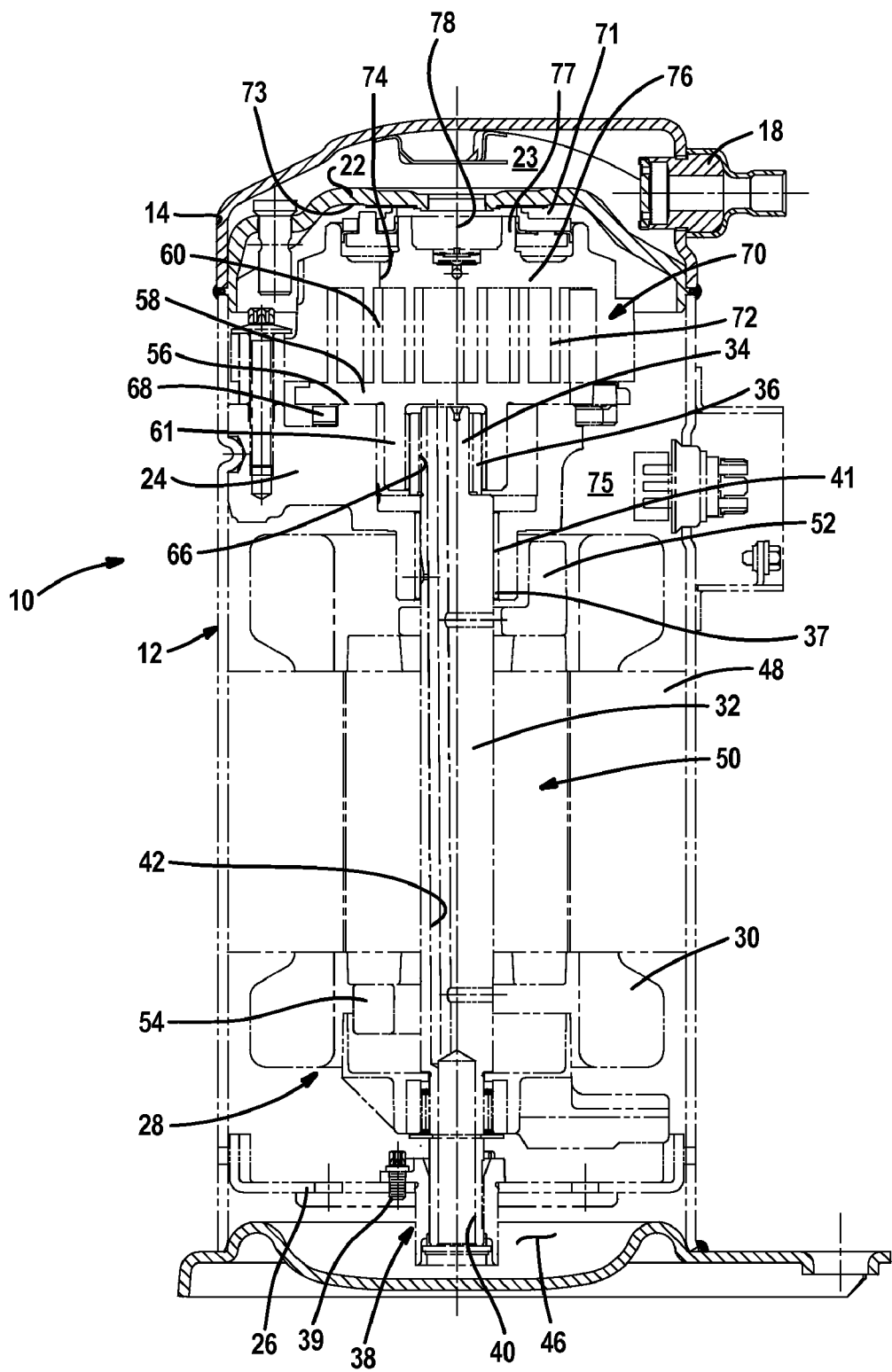
FIG. 1 is a vertical sectional view through the center of a scroll compressor according to the principles of the present disclosure.

The following description is merely exemplary in nature and is not intended to limit the present disclosure, application, or uses. It should be understood that throughout the drawings, corresponding reference numerals indicate like or corresponding parts and features.

The present disclosure resides in the discovery that an Oldham coupling ring comprising a metal material that is surface treated by an anodizing process to form a passivation surface of metal oxides provides improved wear resistance when operated in a carbon dioxide refrigerant compressor. The present disclosure also resides in the further discovery that certain self-lubricating lower bearings, such as those including a polytetrafluoroethylene/bronze material, engaging the crankshaft provide improved wear resistance when operated in a carbon dioxide refrigerant compressor. While the principles of the present disclosure are suitable for incorporation with many different types of scroll machines, for exemplary purposes, it will be described herein incorporated in a scroll machine that process a refrigerant comprising carbon dioxide ($CO_2$) of the structure illustrated in FIG. 1.

Referring now to the drawings and in particular to FIG. 1, a $CO_2$ refrigerant compressor 10 is shown which includes a generally cylindrical hermetic shell 12 having welded at the upper end thereof a cap 14. Cap 14 is provided with a refrigerant discharge fitting 18 which may have the usual discharge valve therein. Other major elements affixed to the shell include an inlet fitting (not shown), a transversely extending partition 22 which is welded about its periphery at the same point that cap 14 is welded to shell 12. A discharge chamber 23 is defined by cap 14 and partition 22. A two-piece main bearing housing 24 and a lower bearing support 26 having a pair of radially outwardly extending legs are each secured to the shell 12. A motor 28 including a motor stator 30 is disposed between the main bearing housing 24 and lower bearing support 26. A crank shaft 32 having an eccentric crank pin 34 at the upper end thereof is rotatably journaled in a drive bushing 36 adjacent an upper bearing 35 disposed in a cylindrical hub 61 of orbiting scroll 58 and a lower bearing assembly 38 in lower bearing support 26. The crank shaft 32 passes through and rotates within an aperture 41 of main bearing housing 24, which may include a cylindrical main bearing member 37 within aperture 41.

Figure 3:
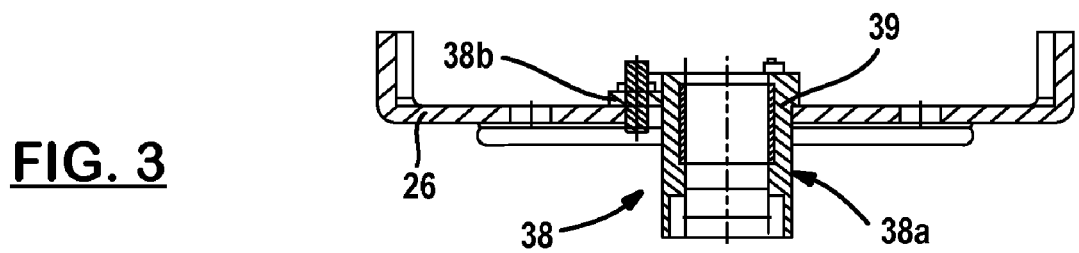
FIG. 3 is a cross-sectional view showing the lower bearing assembly according to the principles of the present disclosure.
Figure 4:
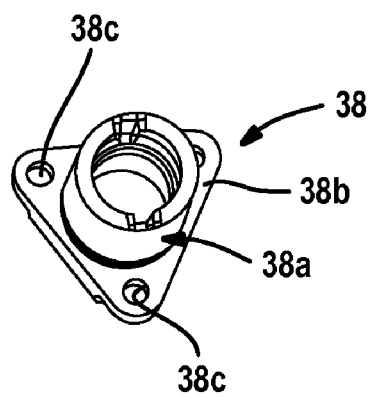
FIG. 4 is a perspective view of the lower bearing according to the principles of the present disclosure.
Figure 5:
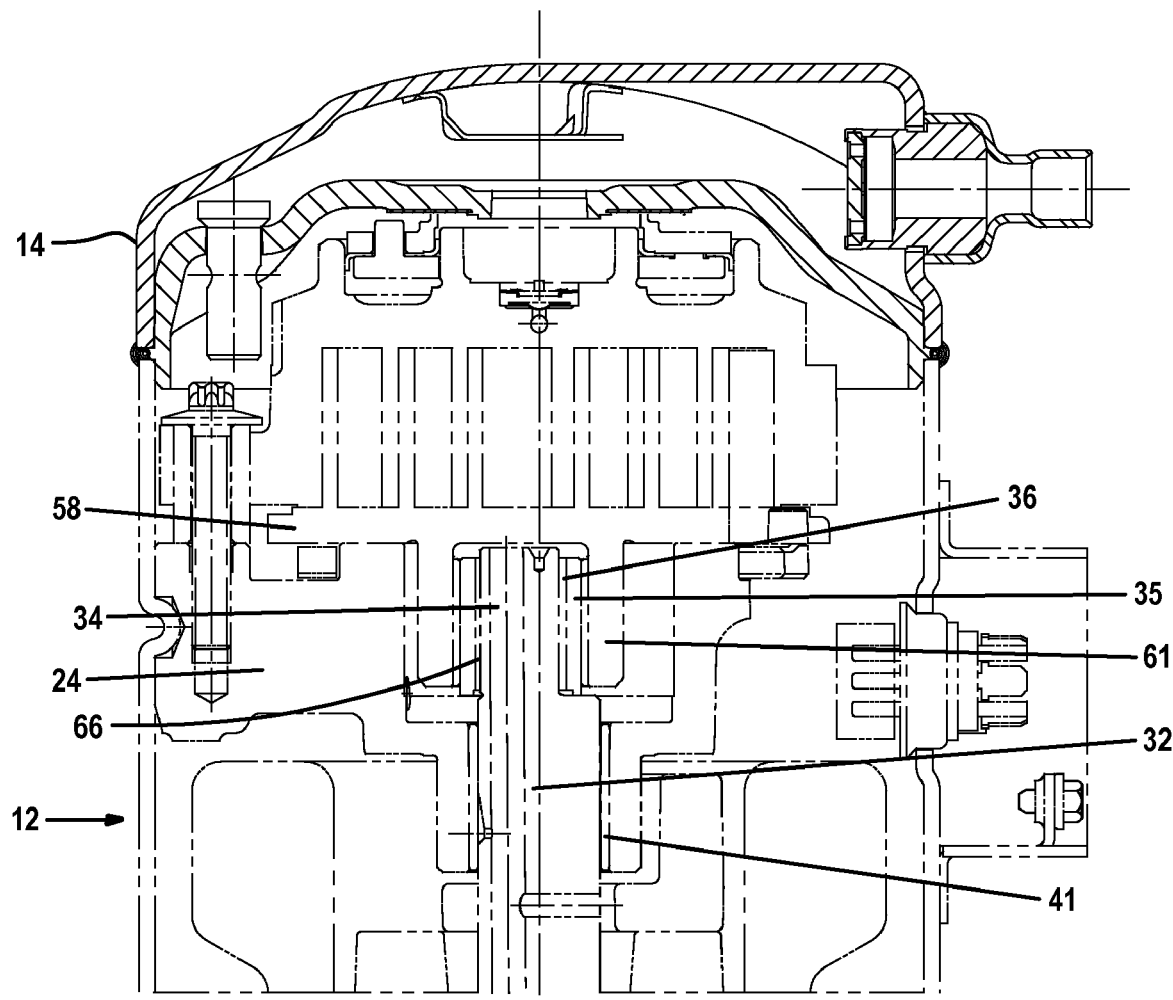
FIG. 5 is a sectional view of an exemplary upper bearing and main bearing according to the present disclosure.

In various aspects, the main bearing member 37, the upper bearing 35 within cylindrical hub 61 of orbiting scroll 58, and/or the lower bearing assembly 38 can include a self-lubricating bearing material for a wear surface, as will be described in greater detail below. As illustrated in FIGS. 3 and 4, the lower bearing assembly 38 includes a bearing housing 38a having a cylindrical opening extending there through and a radially extending flange portion 38b having a plurality of mounting openings 38c therein that allow the bearing housing 38a to be mounted to the lower bearing support 26. The self-lubricating cylindrical bearing member 39 is received in the bearing housing 38a and is disposed directly against the crank shaft 32. Crank shaft 32 has, at the lower end; a relatively large diameter concentric bore 40 which communicates with a radially outwardly smaller diameter bore 42 extending upwardly therefrom from the top of crankshaft 32.

The lower portion of the interior shell 12 defines an oil sump 46 which is filled with lubricating oil. Lubricating oils found to be acceptable for use with the $CO_2$ refrigerant generally include synthetic polyolesters formed from esterification of acid with alcohol. By way of example, one suitable carbon dioxide refrigerant compatible polyolester lubricating oil is commercially available from Croda Industrial Specialities/Uniqema (London, England) under the tradename EMKARATE™ RL 68HB or ES32-178. Another suitable carbon dioxide compatible polyolester oil is available under the product name RENISO™-C85 E sold by Fuchs (Mannheim, Germany). Bore 40 acts as a pump to force lubricating fluid up the crank shaft 32 and into bore 42 and ultimately to all of the various portions of the compressor which require lubrication. Crank shaft 32 is rotatably driven by electric motor 28 including motor stator 30, windings 48 passing therethrough, and a motor rotor 50 press fitted on crank shaft 32 and having upper and lower counterweights 52 and 54, respectively.

The upper surface of the main bearing housing 24 is provided with a flat thrust bearing surface 56 on which is disposed an orbiting scroll 58 having the usual spiral vane or wrap 60 on the upper surface thereof. Projecting downwardly from the lower surface of orbiting scroll 58 is the cylindrical hub 61 having a self-lubricating upper bearing 35 which receives the drive bushing 36 therein which has an inner bore 66 in which crank pin 34 is drivingly disposed. Crank pin 34 has a flat on one surface which drivingly engages a flat surface (not shown) formed in a portion of bore 66 to provide a radially compliant driving arrangement, such as shown in assignee's U.S. Pat. No. 4,877,382, the disclosure of which is hereby incorporated herein by reference. A floating seal 71 is supported by the non-orbiting scroll 70 and engages a seat portion 73 mounted to the partition 22 for sealingly dividing the intake 75 and discharge 23 chambers.

Non-orbiting scroll member 70 is provided having a wrap 72 positioned in meshing engagement with wrap 60 of orbiting scroll 58. Non-orbiting scroll 70 has a centrally disposed discharge passage 74 defined by a base plate portion 76. Non-orbiting scroll 70 also includes an annular hub portion 77 which surrounds the discharge passage 74. A reed valve assembly 78 or other known valve assembly is provided in the discharge passage 74.

Figure 2:
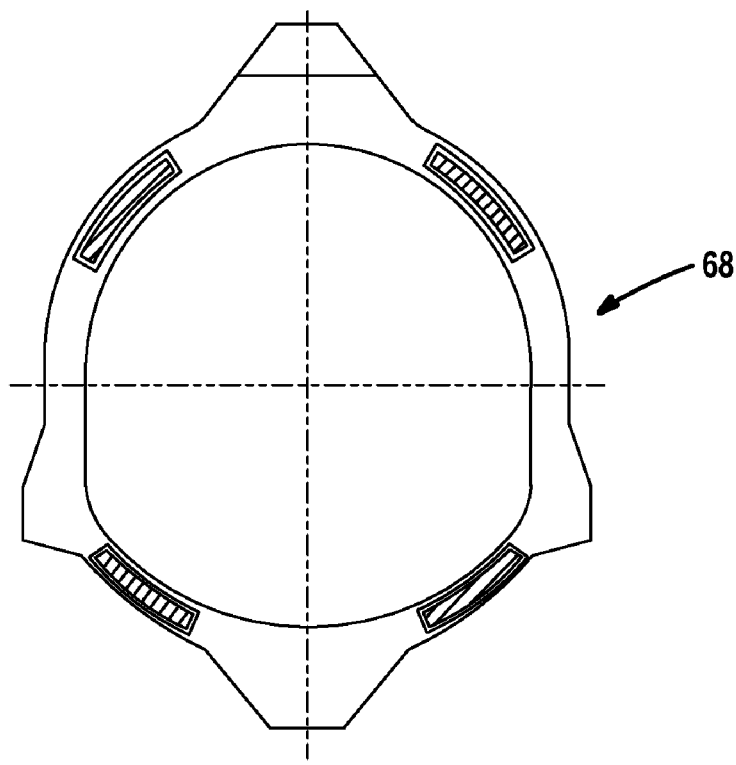
FIG. 2 is a plan view of an Oldham coupling ring according to the principles of the present disclosure.

An Oldham coupling 68 is disposed between orbiting scroll 58 and bearing housing 24. Oldham coupling 68 is keyed to orbiting scroll 58 and a non-orbiting scroll 70 to prevent rotational movement of orbiting scroll member 58. Oldham coupling 68, as shown in FIG. 2, can be of the type disclosed in assignee's U.S. Pat. No. 5,320,506, the disclosure of which is hereby incorporated herein by reference. Such Oldham coupling 68 components experience particularly harsh conditions in a compressor, as they are continually subjected to refrigerant materials, high temperatures, and high physical stresses, particularly torsional stress, and are thus formed of wear-resistant materials that have strength sufficient to withstand fatigue and stress in such an environment. Particular difficulties arise when the refrigerant comprises carbon dioxide. In certain operating regimes, carbon dioxide refrigerant may be subcritical, transcritical or may be in a supercritical state during some operating conditions (e.g., high pressure conditions), where the $CO_2$ is particularly aggressive and corrosive against certain materials. In certain aspects, carbon dioxide behaves as a solvent or corrosive agent and may penetrate a material's surface to cause undesirable adverse reactions, resulting in corrosion, embrittlement, and the like. Additionally, conventional refrigerants containing halogens, particularly chlorides, tend to provide greater lubricity between parts. In certain carbon dioxide scroll machines, the Oldham coupling formed of conventional ferrous-based or aluminum-based metal materials prematurely degrades upon prolonged exposure to carbon dioxide and particulates and debris can form in the compressor which adversely contaminate certain bearings, particularly the lower bearing 39, to reduce bearing and Oldham coupling service lives. This is particularly an issue in hermetic scroll devices, which require long-term durability of all internal components hermetically sealed in the housing shell 12, because maintenance and replacement of Oldham couplings or bearings is typically not an option.

Thus, in various aspects, one or more portions of the Oldham coupling 68 comprise a metal material that is compatible with a refrigerant comprising carbon dioxide, meaning the material(s) does not suffer from excessive physical or chemical degradation in the presence of carbon dioxide to prematurely fail. Further, materials selected for use in the Oldham coupling 68 have a suitable abrasion resistance, wear resistance, and strength to withstand the operating conditions in the scroll machine. In certain aspects, the Oldham coupling 68 metal material comprises aluminum, including aluminum alloys. The materials of the Oldham coupling 68 may be wrought, cast, or sintered in a conventional manner as recognized in the art. It should be understood that aluminum may be alloyed with other common alloying elements, including silicon (Si), copper (Cu), magnesium (Mg), iron (Fe), manganese (Mn), nickel (Ni), tin (Sn), and combinations thereof.

Particularly suitable aluminum alloys comprise greater than or equal to about 79 weight % to less than or equal to about 84 weight % aluminum and optionally further comprise greater than or equal to about 7.5 and less than or equal to about 12 weight % silicon; greater than or equal to about 2 to less than or equal to about 4 weight % copper; greater than or equal to about 1 and less than or equal to about 2 weight % iron, optionally about 1.3 weight % iron; and greater than or equal to about 2.5 and less than or equal to about 3.5 weight % zinc, optionally about 3 weight % zinc.

For example, one particularly suitable aluminum alloy for use in the Oldham coupling 68 is designated as type A380 aluminum alloy (ANSI/AA designation A380.0), which typically comprises greater than or equal to about 7.5 to less than or equal to about 9.5 weight % silicon (nominally about 8.5 wt. % Si); greater than or equal to about 3 to less than or equal to about 4 weight % copper (nominally about 3.5 wt. % Cu); about 3 weight % zinc; about 1.3 weight % iron; about 0.5 weight % manganese; about 0.1 weight % magnesium; about 0.5 weight % nickel; about 0.35 weight % tin; other impurities and diluents at less than or equal to about 0.5 weight %, with a balance of aluminum (ranging from about 80 wt. % to about 83.25 wt. %). Other suitable aluminum alloys include types 383 (ANSI/AA designation 383.0) and 384 (ANSI/AA 384.0). Alloy 383 comprises greater than or equal to about 9.5 to less than or equal to about 11.5 weight % silicon (nominally about 10.5 wt. % Si); greater than or equal to about 2 to less than or equal to about 3 weight % copper (nominally about 2.5 wt. % Cu); about 3 weight % zinc; about 1.3 weight % iron; about 0.5 weight % manganese; about 0.1 weight % magnesium; about 0.3 weight % nickel; about 0.15 weight % tin; other impurities and diluents at less than or equal to about 0.5 weight %, with a balance of aluminum (ranging from about 79.5 wt. % to about 82.75 wt. %). Type 384 comprises greater than or equal to about 10.5 to less than or equal to about 12 weight % silicon (nominally about 11 wt. % Si); greater than or equal to about 3.0 to less than or equal to about 4.5 weight % copper (nominally about 3.8 wt. % Cu); about 3 weight % zinc; about 1.3 weight % iron; about 0.5 weight % manganese; about 0.1 weight % magnesium; about 0.5 weight % nickel; about 0.35 weight % tin; other impurities and diluents at less than or equal to about 0.5 weight %, with a balance of aluminum (ranging from about 77.25 wt. % to about 80.25 wt. %).

While such aluminum alloys, like type A380, are particularly suitable to form the Oldham coupling 68, because they have relatively good fluidity, pressure tightness, hot strength, and elevated temperature strength, it may not exhibit sufficient corrosion and/or wear resistance when exposed to a carbon dioxide environment. In fact, significant degradation of Oldham coupling made of Aluminum metal materials can occur in $CO_2$ compressors causing compressor failure. In certain aspects, the metal material of the Oldham coupling 68 is further surface treated by an anodizing process or electrolytic conversion to create a passivation layer that provides improved wear resistance when operated in a $CO_2$ refrigerant compressor. However, certain desirable aluminum alloys, like types A380, 383, or 384 are known to be form anodized surface coatings having only poor to fair quality. While not limiting the present teachings to any particular theory, it is believed that aluminum alloys with particularly high silicon content (by way of non-limiting example silicon present at greater than about 7.5 wt. %) may potentially pose issues in forming stable high quality passivation layers during anodization.

Anodizing or passivation generally refers to a conversion process of treating a metal via anodic oxidation to form a conversion coating or surface passivation layer that is toughened, hardened, and/or more electrochemically inert than the underlying metal. Where the metal comprises aluminum, for example, a passivation surface layer of metal oxide is formed, such as aluminum oxide, which is a reacted finish (integrated and bonded with the base metal) that is significantly less electrochemically reactive, more durable, and more wear resistant than the base aluminum metal. Many different methods of aluminum anodization are well-known in the art.

Selecting an anodization process depends on the alloy properties and the protection layer needed for operating conditions in the $CO_2$ processor. During anodizing, the material surface to be passivated is typically exposed to an electrolyte. An electrode is in electrical communication with the material to be anodized to form an anode, while an electrode of opposite polarity contacts the electrolyte, and electrical current is applied. The most common conventional anodization electrolytes include solutions of chromic acid or sulfuric acid.

So-called "hard anodizing" is a particular type of anodizing that forms a passivation layer that enhances surface hardness and abrasion resistance. The passivation layer formed via hard anodizing is typically referred to as a Type III anodized hardcoat, which has a relatively high wear resistance and hardness, for example, having a hardness ranging from about 60 C to about 70 C on the Rockwell Hardness scale. In certain aspects, the passivation layer on the anodized surface is left unsealed to maintain porosity and desirable wear resistance. Hard anodizing may require special anodizing conditions, including for example, low temperature, high current density, and/or particular electrolytes to reduce formation of potentially softer and more porous outer layers of the anodic coating. In accordance with certain aspects of the present invention, certain suitable aluminum alloys, such as type A380 or alternately types 383 or 384 are processed in accordance with the present disclosure to form quality, durable wear resistant passivation layers via hard coating anodization techniques.

By way of example, one suitable hard coating anodization process for an aluminum alloy uses an electrolyte comprising phosphoric acid (for example, from about 10 to 15 wt. % acid solution) at a temperature of about 0 to 10° C. and a current density of about 2 to 3.6 A/ft$^2$. In yet another particularly suitable anodization process for an aluminum alloy, an electrolyte of chromic acid on aluminum forms aluminum oxide via anodization, which is described in more detail in "Metals Handbook," 8th Edition, Vol. 2, p. 621 (American Society for Metals, 1964) and "Metals Handbook Desk Edition" pp. 29•44-29•45 (American Society for Metals, 1985), which are respectively incorporated herein by reference. Depending on the anodization method used, the duration of processing to form the passivation layer varies from about five minutes to over 4 hours.

Thus, in certain aspects, the anodizing process provides a Type III anodized hardcoat having a thickness of greater than or equal to about 5 and less than or equal to about 15 micrometers (μm); and in certain aspects, optionally greater than or equal to about 5 and less than or equal to about 10 μm. In various aspects, the thickness of the passivation layer is at least 5 μm thick, optionally greater than or equal to about 0.5 μm to less than or equal to about 15 μm, depending on the integrity and wear resistance characteristics of the passivation layer formed. The passivation layer formed in accordance with the present disclosure has a relatively high wear resistance and hardness, for example, having a hardness ranging from about 60 to about 70 C Rockwell Hardness and is further stable in the presence of carbon dioxide refrigerant. The passivation layer coating (e.g., metal oxide layer) penetrates the aluminum alloy approximately equal to the amount of surface build up, wherein the thickness includes both the build up and penetration. Further, in various aspects, the anodized surface is fully coated by the passivation layer, having no uneven build-up of coating, pin holes or chipped regions. The thickness of the passivation layer can be measured by ASTM standard B244, entitled "Measurement of Thickness of Anodic Coatings on Aluminum and of Other Nonconductive Coatings on Nonmagnetic Basis Metals with Eddy-Current Instruments," for example on an exemplary Oldham coupling key face as a datum surface. In various aspects, the anodized surface comprising the passivation layer is capable of use for at least 1,000 hours of scroll machine operation, optionally at least about 1,500 hours of scroll machine operation, preferably at least about 2,000 hours or longer of scroll machine operation/service processing a refrigerant comprising carbon dioxide.

Another measure of compressor component longevity is to quantify compressor coefficient of performance (COP) in a refrigeration system, which generally indicates the efficiency of the compressor. As internal components potentially degrade in their performance the COP will likewise be reduced. The COP is usually defined as a ratio of the heating capacity of the compressor/system ($Q_{in}$ or the enthalpy entering the system) to the work/electric power consumption of the compressor (and in some cases also the power consumption of the fan). Thus, COP is generally defined as the heating capacity of the system divided by the power input to the system and can be a useful measure of the compressor's performance. In various aspects, the performance of a compressor has a COP loss defined by $$\Delta COP\ (\%) = \frac{(COP_{initial} - COP_{final})}{COP_{initial}} \times 100,$$

where $COP_{initial}$ is an initial COP measured at the beginning of compressor operation and $COP_{final}$ is compressor performance at the end of a reliability test. In certain aspects, the performance of a compressor having the Oldham coupling with an anodized surface comprising a passivation layer has a COP loss of less than or equal to about 5% over 1,000 hours of compressor performance; optionally less than or equal to about 4% change in COP over 1,000 hours of compressor performance; optionally less than or equal to about 3% change in COP over 1,000 hours of compressor performance. In certain aspects, the compressor has a COP loss of less than or equal to about 5% change in COP over 1,500 hours of compressor performance; optionally less than or equal to about 4% change in COP over 1,500 hours of compressor performance; and in certain aspects, optionally less than or equal to about 3% change in COP over 1,500 hours of compressor performance. In certain aspects, the compressor has a COP loss of optionally less than or equal to about 5% change in COP over 2,000 hours of compressor performance; optionally less than or equal to about 4% change in COP over 2,000 hours of compressor performance.

In certain aspects, the selection of a metal material comprising aluminum which is anodized to form a passivation layer on the Oldham coupling can provide significant performance benefits in a compressor processing a refrigerant comprising $CO_2$. In alternate aspects, the $CO_2$ scroll machine may have one or more bearing materials that likewise further improve compressor performance, particularly in combination with an anodized Oldham surface embodiment. However, employing the anodized Oldham coupling or the self-lubricating carbon dioxide compatible bearing material can independently provide significant compressor performance benefits.

As noted above, in various aspects, the lower bearing assembly 38 includes the lower bearing member 39 comprising a self-lubricating bearing material. The main bearing member 37 and/or the upper bearing 35 within the cylindrical hub 61 of orbiting scroll 58 may also optionally include such self-lubricating bearing materials. Such a material must fulfill certain performance criteria while avoiding degradation by exposure to carbon dioxide refrigerant, particularly transcritical or supercritical carbon dioxide or liquid phase of subcritical carbon dioxide. As noted above, carbon dioxide may behave as an organic solvent and/or corrosion agent, so that the carbon dioxide may permeate into a material and cause physical or chemical alterations. Thus, in accordance with the present disclosure, it is desirable to provide a self-lubricating bearing material that is stable upon exposure to carbon dioxide refrigerant throughout compressor operating conditions. Hermetic compressors, in particular, require bearing materials having long service life and superior long-term wear resistance; as such materials generally cannot be replaced via maintenance.

In certain aspects, a particularly suitable self-lubricating bearing material includes a steel backing layer that is overlaid with a sliding layer or alternatively a bronze backing layer overlaid with a sliding layer. In certain aspects, a sintered porous bronze metal layer can be formed over the steel backing layer, for example a bronze metal comprising about 88 to about 90 wt. % copper and about 10 to 12 wt. % tin. Such a bronze metal layer is optionally impregnated with a resin that is stable upon exposure to carbon dioxide, such as a fluoropolymer. The polymer resin which impregnates the pores of the sintered bronze material to form a sliding layer. Certain self-lubricating bearing member materials further comprise at least one solid lubricant comprising an element selected from the group consisting of lead, molybdenum, carbon, tin, and combinations thereof. For example, suitable non-limiting examples of solid lubricant materials that can be dispersed in the resin that impregnates the porous bronze layer include graphite particles, carbon fibers, lead particles, molybdenum disulfide particles, tin particles, and combinations thereof. Suitable bearings of these types are described in U.S. Pat. Nos. 6,425,977 to McDonald et al., 5,911,514 to Davies, and 6,461,679 to McMeekin et al., the relevant portions of each of these being incorporated by reference herein. Table 1 below sets forth various suitable commercially available self-lubricating bearing materials for use in the scroll machines of the present disclosure, by way of example.

TABLE 1

| Bearing | Manufacturer | Bearing Composition Information |
|---------|--------------|--------------------------------|
| DU ® | GGB, L.L.C. | A self-lubricating layered bearing having:<br>1) a steel backing layer;<br>2) a porous bronze;<br>3) a sliding layer filling pores of the porous bronze layer that has a polytetrafluoroethylene (PTFE) resin and lead particles. |
| DP4 ™ | GGB, L.L.C. | A lead-free self-lubricating layered bearing having:<br>1) a steel backing layer;<br>2) a porous bronze;<br>3) a sliding layer filling pores of the porous bronze layer that has a polytetrafluoroethylene (PTFE) resin, alkali earth metals ($CaF_2$), and polymer fillers (aramid fibers). |
| DP31 ™ | GGB, L.L.C. | A lead-free self-lubricating layered bearing having:<br>1) a steel backing layer;<br>2) a porous bronze;<br>3) a sliding layer filling pores of the porous bronze layer that has a polytetrafluoroethylene (PTFE), calcium fluoride($CaF_2$), fluoropolymer, and fillers. |
| KS P141 | Schaeffler KG (INA Brand) | A lead-free self-lubricating layered bearing having:<br>1) a steel backing layer;<br>2) a porous bronze intermediate layer; and<br>3) a sliding layer that has a resin filling pores of the porous bronze layer comprising:<br>i) Polytetrafluoroethylene (PTFE) resin at 75 vol. %<br>ii) Perfluoroalkoxy at 5 vol. %;<br>iii) ZnS particles at 17 vol. %; and<br>iv) Carbon fibers at 3 vol. %. |
| KS P14 | Schaeffler KG (INA Brand) | A lead-free self-lubricating layered bearing having:<br>1) a steel backing layer;<br>2) a porous bronze intermediate layer; and<br>3) a sliding layer that has a resin filling pores of the porous bronze layer comprising:<br>i) Polytetrafluoroethylene (PTFE) resin at 75 vol. %; and<br>iii) ZnS particles at 25 vol. %. |

In certain aspects, a particularly suitable fluoropolymer comprises polytetrafluoroethylene (PTFE), which impregnates the pores of the sintered bronze material to form a sliding layer. Such a polytetrafluoroethylene/bronze surface layer engages the crankshaft to provide improved wear resistance when operated in the $CO_2$ refrigerant compressor 10. In certain aspects, the layer of sintered bronze material impregnated with polytetrafluoroethylene optionally further comprises molybdenum disulfide dispersed therein, such as described in U.S. Pat. No. 6,425,977 discussed above. In addition to providing desirable wear resistance against the crankshaft during harsh operating conditions and applied stress, as well as exposure to carbon dioxide, certain self-lubricating bearing materials are advantageously lead-free to meet environmental initiatives. Bearings of this type are commercially available from Schaeffler KG (INA Brand) such as P14, and GGB, L.L.C., such as PP-4™ and DP-31™. A suitable lead-containing bearing for use in a $CO_2$ compressor is the DU® sold by GGB, L.L.C. Preferred bearing materials for use with $CO_2$ refrigerant compressors include DU®, DP-31™, as well as the bearings of type described in U.S. Pat. No. 6,425,977.

In various aspects, a carbon dioxide scroll machine comprises a self-lubricating bearing member is capable of use for at least 1,000 hours of scroll machine operation, optionally at least about 1,500 hours of scroll machine operation, and preferably in certain embodiments, at least about 2,000 hours or longer of scroll machine operation/service processing a refrigerant comprising carbon dioxide.

In certain aspects, the performance of a compressor having the self-lubricating bearing member has a COP loss of less than or equal to about 5% over 1,000 hours of compressor performance; optionally less than or equal to about 4% change in COP over 1,000 hours of compressor performance; optionally less than or equal to about 3% change in COP over 1,000 hours of compressor performance. In certain aspects, the compressor having a self-lubricating bearing member has a COP loss of less than or equal to about 5% change in COP over 1,500 hours of compressor performance; optionally less than or equal to about 4% change in COP over 1,500 hours of compressor performance; and in certain aspects, optionally less than or equal to about 3% change in COP over 1,500 hours of compressor performance. In yet other aspects, the compressor has a COP loss of optionally less than or equal to about 5% change in COP over 2,000 hours of compressor performance; optionally less than or equal to about 4% change in COP over 2,000 hours of compressor performance.

In one aspect, a carbon dioxide scroll machine is provided that processes a refrigerant comprising carbon dioxide. The scroll machine includes a first scroll member having a discharge port and a first spiral wrap and a second scroll member having a second spiral wrap. The first and second spiral wraps are mutually intermeshed, where a drive mechanism for causing the second scroll member to orbit with respect to the first scroll member, whereby said wraps create at least one enclosed space of progressively changing volume between a peripheral suction zone defined by said scroll members and said discharge port. The drive mechanism includes a crankshaft drivingly engaging the second scroll member. The scroll machine also comprises a bearing assembly engaging the crankshaft, where the bearing assembly including a bearing housing defining a cylindrical opening extending there through and a self-lubricating bearing member received in the bearing housing and disposed directly against the shaft. The self-lubricating bearing member is of any of the embodiments described above and is capable of use for at least 1,000 hours of carbon dioxide scroll machine operation.

In yet another aspect, the present teachings pertain to a scroll machine including a first scroll member having a discharge port and a first spiral wrap, as well as a second scroll member having a second spiral wrap. The first and second spiral wraps are mutually intermeshed. The scroll machine also has a discharge chamber in fluid communication with the discharge port of the first scroll member. A motor causes the second scroll member to orbit with respect to the first scroll member, where the wraps create at least one enclosed space of progressively changing volume between a peripheral suction zone defined by the scroll members and the discharge port to generate a pressurized fluid. Further, the scroll machine includes an Oldham coupling keyed to both the first and second scroll members to prevent rotational movement of the second scroll member.

The Oldham coupling is formed of a metal material that comprises aluminum and has an anodized surface comprising a passivation layer. In such an embodiment, the anodized surface comprising the passivation layer is capable of use for at least 1,000 hours of scroll machine operation, optionally at least about 1,500 hours of scroll machine operation, preferably at least about 2,000 hours or longer of scroll machine operation/service processing a refrigerant comprising carbon dioxide. In yet other aspects, the performance of a carbon dioxide compressor having the Oldham coupling with the anodized surface comprising the passivation layer has a COP loss of less than or equal to about 5% over 1,000 hours of compressor performance; optionally less than or equal to about 4% change in COP over 1,000 hours of compressor performance; optionally less than or equal to about 3% change in COP over 1,000 hours of compressor performance, as defined above. In certain alternate aspects, the scroll machine may further comprise a self-lubricating bearing compatible with refrigerant comprising carbon dioxide, as fully described above.

The invention claimed is:

1. A scroll machine comprising:
a first scroll member having a discharge port and a first spiral wrap;
a second scroll member having a second spiral wrap, said first and second spiral wraps being mutually intermeshed;
a discharge chamber in fluid communication with said discharge port;
a motor for causing said second scroll member to orbit with respect to said first scroll member, whereby said wraps create at least one enclosed space of progressively changing volume between a peripheral suction zone defined by said scroll members and said discharge port, wherein the scroll machine is configured to process a refrigerant comprising carbon dioxide; and
an Oldham coupling keyed to said second scroll member and said first scroll member to prevent rotational movement of said second scroll member, said Oldham coupling being formed from a metal material comprising aluminum and having an unsealed porous anodized surface comprising a Type III hardcoat passivation layer, wherein at least a portion of the unsealed porous anodized surface is a contact surface that provides wear resistance in the presence of said refrigerant comprising carbon dioxide for at least 1,000 hours of scroll machine operation.

2. The scroll machine according to claim 1, wherein said passivation layer has a thickness of about 5 to about 15 micrometers.

3. The scroll machine according to claim 1, wherein said unsealed porous anodized surface has a Rockwell hardness of about 60 C to about 70 C.

4. The scroll machine according to claim 1, wherein said metal material comprises greater than or equal to about 79 and less than or equal to about 84 weight % aluminum and further comprises greater than or equal to about 7.5 and less than or equal to about 12 weight % silicon; greater than or equal to about 2 to less than or equal to about 4 weight % copper; greater than or equal to about 1 and less than or equal to about 2 weight % iron; and greater than or equal to about 2.5 and less than or equal to about 3.5 weight % zinc.

5. The scroll machine according to claim 1, wherein said metal material comprises a type A380 aluminum alloy.

6. The scroll machine according to claim 1, wherein said unsealed porous anodized surface comprising said passivation layer provides a wear resistance to provide scroll performance of less than or equal to about 5% loss of coefficient of performance (COP) over 1,000 hours of scroll machine operation.

7. A scroll machine comprising:
a shell;
a first scroll member disposed in said shell and having a first spiral wrap;

a second scroll member disposed in said shell and having a second spiral wrap, said first and second spiral wraps being mutually intermeshed;

a drive mechanism for causing said first scroll member to orbit with respect to said second scroll member, whereby said wraps create at least one enclosed space of progressively changing volume between a peripheral suction zone defined by said scroll members and a discharge port defined by said second scroll member;

a bearing housing disposed below said first scroll member defining a cylindrical opening extending there through and a self-lubricating bearing member received in said bearing housing and disposed directly against said shaft comprising a self-lubricating bearing material, wherein the scroll machine is configured to process a refrigerant comprising carbon dioxide; and an Oldham coupling disposed between said first scroll member and said bearing housing to prevent rotational movement of said first scroll member, said Oldham coupling being formed from a metal material comprising aluminum and silicon at greater than or equal to about 7.5 weight % and having an anodized unsealed porous surface comprising a Type III hardcoat passivation layer having a thickness of greater than or equal to about 5 micrometers, wherein the Oldham coupling and the self-lubricating bearing provide wear resistance in the presence of said refrigerant comprising carbon dioxide for at least 1,000 hours of scroll machine operation.

8. The scroll machine according to claim 7, wherein said Type III hardcoat passivation layer has a Rockwell hardness of about 60 C to about 70 C.

9. The scroll machine according to claim 7, wherein said metal material comprises greater than or equal to about 79 and less than or equal to about 84 weight % aluminum and further comprises greater than or equal to about 7.5 and less than or equal to about 12 weight % silicon; greater than or equal to about 2 to less than or equal to about 4 weight % copper; greater than or equal to about 1 and less than or equal to about 2 weight % iron; and greater than or equal to about 2.5 and less than or equal to about 3.5 weight % zinc.

10. The scroll machine according to claim 7, wherein said metal material comprises an A380 aluminum alloy.

11. The scroll machine according to claim 7, wherein said anodized unsealed porous surface comprising said passivation layer has a wear resistance that enables at least 1,000 hours of scroll machine operation.

12. The scroll machine according to claim 11, wherein said anodized unsealed porous surface comprising said passivation layer and said self-lubricating bearing provides for the scroll machine to have less than or equal to about 5% loss of coefficient of performance over 1,000 hours of scroll machine operation.

13. The scroll machine according to claim 7, wherein said self-lubricating bearing member comprises a steel backing overlaid with a layer of sintered bronze material impregnated with polytetrafluoroethylene.

14. The scroll machine according to claim 13, wherein said layer of sintered bronze material impregnated with polytetrafluoroethylene further comprises at least one solid lubricant comprising an element selected from the group consisting of lead, molybdenum, carbon, tin, and combinations thereof.

15. A carbon dioxide scroll machine that processes a refrigerant comprising carbon dioxide, the machine comprising:

a first scroll member having a discharge port and a first spiral wrap;

a second scroll member having a second spiral wrap, said first and second spiral wraps being mutually intermeshed;

a drive mechanism for causing said second scroll member to orbit with respect to said first scroll member, whereby said wraps create at least one enclosed space of progressively changing volume between a peripheral suction zone defined by said scroll members and said discharge port, said drive mechanism including a crankshaft drivingly engaging said second scroll member; and a bearing assembly engaging said crankshaft, said bearing assembly including a bearing housing defining a cylindrical opening extending there through and a self-lubricating bearing member received in said bearing housing and disposed directly against said shaft, wherein said self-lubricating bearing member has a wear resistance in the presence of the refrigerant comprising carbon dioxide that enables at least 1,000 hours of carbon dioxide scroll machine operation.

16. The carbon dioxide scroll machine according to claim 15, wherein said self-lubricating bearing member comprises a steel backing overlaid with a layer of sintered bronze material impregnated with polytetraflouroethylene.

17. The carbon dioxide scroll machine according to claim 16, wherein said layer of sintered bronze material impregnated with polytetrafluoroethylene further comprises at least one solid lubricant comprising an element selected from the group consisting of lead, molybdenum, carbon, tin, and combinations thereof.

18. The carbon dioxide scroll machine according to claim 15, wherein the bearing assembly is a lower bearing assembly disposed at a terminal end of said shaft.

* * * * *